US006856655B1

United States Patent
Garcia

(10) Patent No.: US 6,856,655 B1
(45) Date of Patent: Feb. 15, 2005

(54) TIMING RECOVERY DEVICE AND METHOD FOR TELECOMMUNICATIONS SYSTEMS

(75) Inventor: Domingo G. Garcia, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 657 days.

(21) Appl. No.: 09/713,580

(22) Filed: Nov. 15, 2000

Related U.S. Application Data

(60) Provisional application No. 60/171,346, filed on Dec. 21, 1999.

(51) Int. Cl.[7] .............................................. H04L 23/00

(52) U.S. Cl. ..................................................... 375/326

(58) Field of Search .................................. 375/261, 229, 375/232, 316, 326, 377, 233, 222, 201, 235; 370/335, 342, 326

(56) References Cited

U.S. PATENT DOCUMENTS

| | | | | |
|---|---|---|---|---|
| 4,334,313 A | * | 6/1982 | Gitlin et al. ................. | 375/106 |
| 5,228,060 A | * | 7/1993 | Uchiyama ..................... | 375/75 |
| 5,859,877 A | | 1/1999 | Betts et al. .................. | 375/298 |
| 5,930,309 A | * | 7/1999 | Knutson et al. ............. | 375/340 |
| 6,243,369 B1 | * | 6/2001 | Grimwood et al. .......... | 370/335 |
| 6,252,903 B1 | * | 6/2001 | Werner et al. ............... | 375/232 |
| 6,687,292 B1 | * | 2/2004 | Garcia ......................... | 375/235 |
| 6,697,345 B1 | * | 2/2004 | Corrigan et al. ............ | 370/330 |

* cited by examiner

Primary Examiner—Mohammed Ghayour
Assistant Examiner—Dung X. Nguyen
(74) Attorney, Agent, or Firm—Robert D. Marshall, Jr.; W. James Brady, III; Frederick J. Telecky, Jr.

(57) ABSTRACT

A timing recovery device for CAP/QAM modems includes an equalizer filter designed to monitor the movement of the filter coefficients within a memory buffer and to adjust the relative position of the filter coefficients within the memory buffer so that the coefficients remain substantially centered within the buffer.

12 Claims, 2 Drawing Sheets

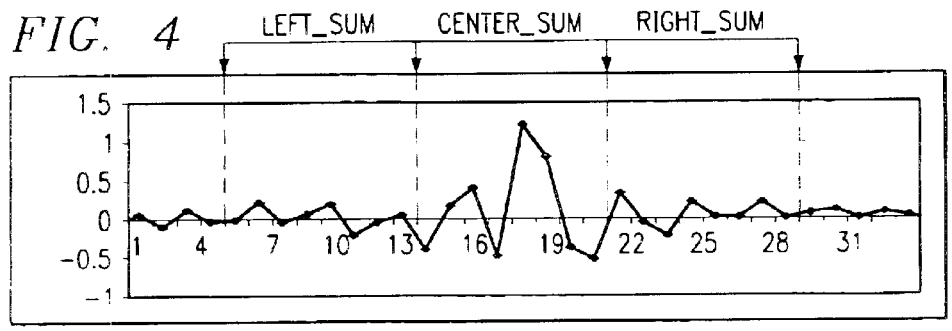
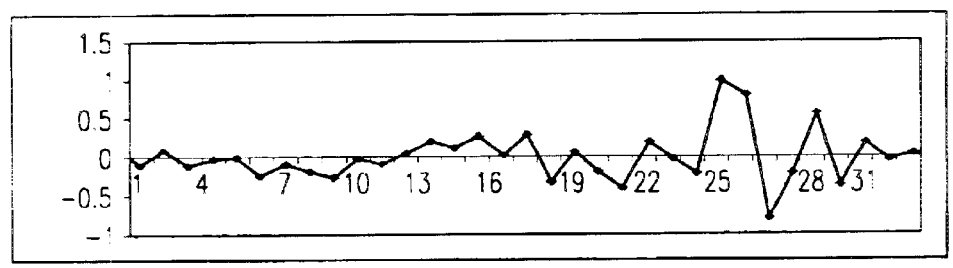
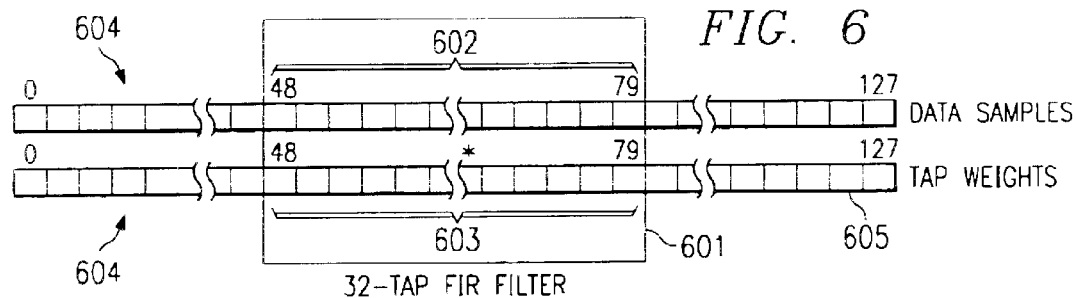
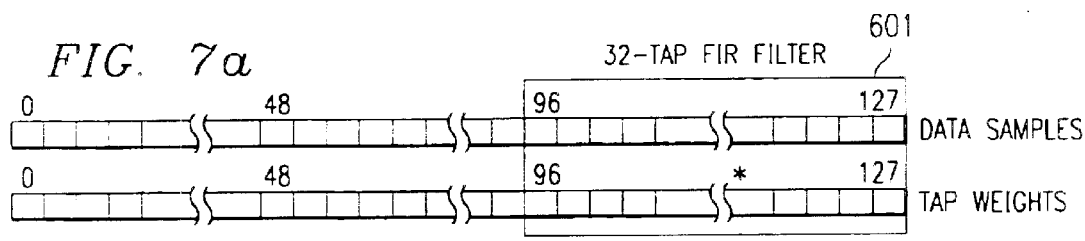
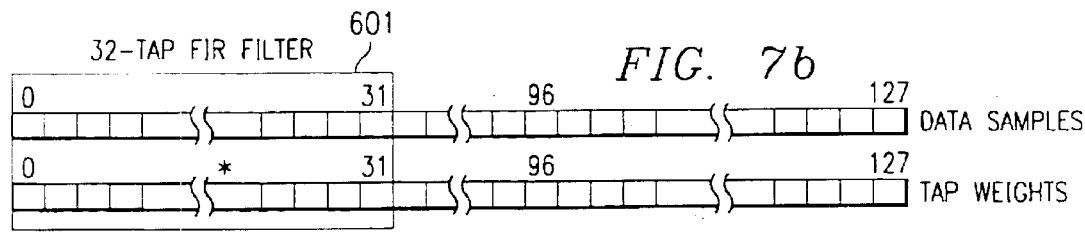

TIMING RECOVERY DEVICE AND METHOD FOR TELECOMMUNICATIONS SYSTEMS

This application claims the benefit of Provisional Application No. 60/171,346 filed Dec. 21, 1999.

TECHNICAL FIELD OF THE INVENTION

This invention relates generally to the field of telecommunications and is more specifically related to CAP/QAM modems and improvements therein.

BACKGROUND OF THE INVENTION

In recent years, the data rates at which communications may be carried out over conventional telephone networks and wiring has greatly increased. These increases are due, in large part, to newly adopted techniques of multiplexing and modulating signals representative of the messages or data being communicated, resulting in greatly improved communication bandwidth. In addition, the carrier frequencies at which such communications are being carried out have also increased in recent years, further improving the bit rate.

In general, the local oscillator frequencies used in a transmitting modem and a receiving modem are not identical. The frequencies of their clocks can be off by as much as 100 ppm. One of the tasks of the receiving modem is to generate a signal that allows it to sample the output of the receiver portion of the modem at the best timing instant. The best timing instant gives the best estimate of the instant to sample the transmitted data. In doing so, the receiver must first acquire and then track the frequency drift of the transmitter's clock. This invention provides a novel method for solving this problem, and is especially useful in burst CAP/QAM modems.

Use of quadrature modulation is intended to increase the information-carrying capacity of a modulated signal. One such modulation is Quadrature Amplitude Modulation (QAM), described by Betts et al. in U.S. Pat. No. 5,859,877. QAM involves transmitting data as a sequence of two-dimensional complex signals, i.e. with both in-phase and quadrature components. Each symbol, is assigned a specific pre-defined value according to the data it represents. A set of all of the values available for transmission is termed a constellation, and so resembles a constellation when graphically plotted on a two-dimensional basis.

Another modulation scheme is Carrierless Amplitude Phase modulation (CAP). Receivers using CAP modulation are a bandwidth-efficient means for receiving modulated signals using two-dimensional pass band line code in which the symbol data is organized in I and Q pairs. Knutson et al, U.S. Pat. No. 5,930,309, describes a receiver signal processing system for CAP signals. The I and Q data in such a system are filtered with orthogonal I and Q band pass filters having a common pass band. With CAP, processing is done in the pass band of the filters, which eliminates the need for a carrier tracking loop. However, tighter symbol timing constraints is required due to the frequencies of the pulses transmitted. CAP signals can resemble QAM signals except the transmitted data is not spinning or rotating at a carrier frequency.

There are several conventional ways to perform timing recovery in a CAP/QAM system. One method is to implement a phase lock loop (PLL) using a combination of analog and digital techniques as shown in FIG. 1. A Timing Phase Detector (TPD) processes the incoming data samples, s[n], sampled from a signal S(t) by using an analog to digital converter (A/D) 104. One known method, which can perform the function of the TPD 101, is a Band Edge Component Maximization (BECM) process which generates an error signal that is proportional to the difference in phase between the transmitter and receiver clocks. The error signal generated by the TPD 101 is filtered (or averaged) and passed on to a digital to analog (D/A) converter 102. The D/A converter output is used to control the frequency of a voltage controlled oscillator (VCO) 103. The advantage of this approach is that the rest of the receiver does not need to comprehend the timing mismatches. It assumes that the incoming data stream has been sampled at the optimum instant. However, a disadvantage of this approach is the mixing of both analog and digital circuitry.

Another known method for performing timing recovery is an all digital implementation of a PLL as illustrated in FIG. 2. The receiver A/D converter is clocked by a free running oscillator 201. As in the first method, a Timing Phase Detector 101 is used to determine the phase error between the transmitter and receiver clocks according to the frequency of the free running oscillator 201. The error signal from the TPD 101 is then passed to an interpolator 202. The interpolator 202 generates optimally sampled data samples s*[n] based on the signal S(t) sampled by the fee running oscillator at a frequency regulated by the receiver clock. The interpolator 202 adds a fractional delay (less than 1 sample period delay) between the A/D converter and the rest of the receiver processing based on the error signal. The amount of delay is increased or decreased to correct for the transmitter clock drift measured by the TPD. A disadvantage of this method arises when a sample is to be inserted or deleted and the amount of delay required by the interpolator is more than one sample period to be inserted and less than one sample period to be deleted, respectively. As a consequence, when a sample must be inserted, for example the receiver has one sample period less time to process the signal and information may be lost.

SUMMARY OF THE INVENTION

Accordingly, a need has arisen in the art for a method and apparatus to provide timing recovery for CAP/QAM modems whereby the highest valued coefficients or tap weights of the system equalizers remain substantially centered in a tracking buffer, thereby preventing these coefficients from drifting to one side of the filter.

In accordance with the present invention, a timing recovery method and device are provided for processing a digital signal having an in-phase portion and a quadrature portion. An in-phase equalizer may be provided for processing an in-phase portion of the signal, and a quadrature equalizer may be provided for processing the quadrature portion of the signal.

A buffer management device is provided for storing a set of in-phase coefficients and a set of quadrature coefficients in a memory device such as tracking buffers. The in-phase and quadrature coefficients are used to define the characteristic functions of the in-phase and quadrature equalizers. The buffer management device compares the relative movement of the largest coefficients within the tracking buffers and shifts the in-phase and quadrature coefficients within the tracking buffer such that the largest in-phase and quadrature coefficients remain substantially centered within the tracking buffer. Thus, as the coefficients are updated to correct for timing drift, the buffer management device prevents the largest coefficients from migrating out of the tracking buffer.

Other technical advantages of the present invention will be readily apparent to one skilled in the art from the following figures, descriptions, and claims.

BRIEF DESCRIPTION OF THE DRAWINGS

For a more complete understanding of the present invention and its advantages thereof, reference is now made to the following description taken in conjunction with the accompanying drawing, wherein like reference numerals represent like parts, in which:

FIG. 4 is an example of a length-32 set of coefficient values in a filter buffer for a converged equalizer;

FIG. 5 is an example of a length-32 set of coefficient values in a filter buffer reflecting timing drift for an equalizer after a period of time;

FIG. 6 is diagram of a length-32 tap digital filter for a timing recovery device according to the invention; and FIGS. 7a and 7b are diagrams of a length-32 tap digital filter for a timing recovery device illustrating the limits of a system using length-32 filter buffers within 128-element tracking buffers.

DETAILED DESCRIPTION OF THE INVENTION

Figure 1:
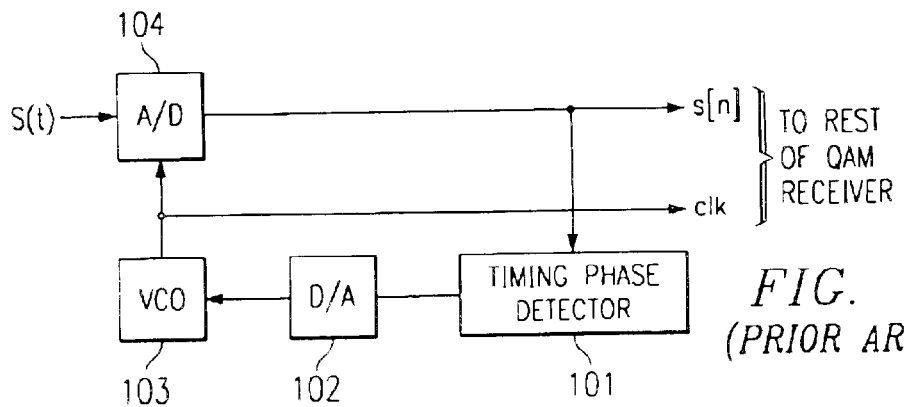
FIG. 1 is a block diagram of a prior art Phase Lock Loop.
Figure 2:
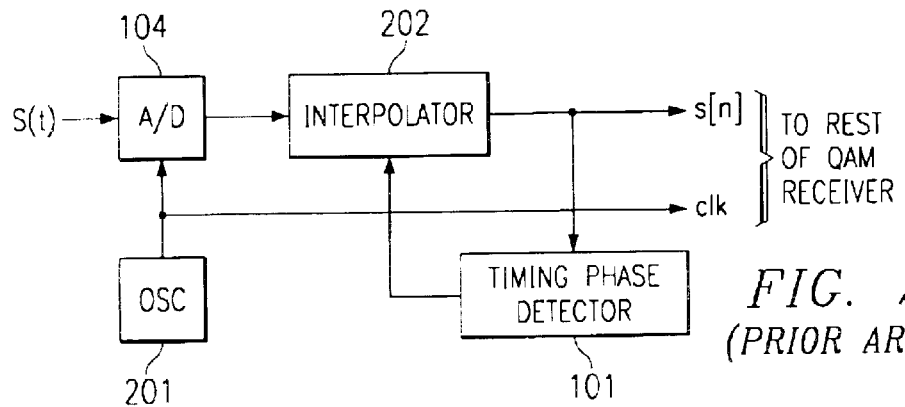
FIG. 2 is a block diagram of a prior art digitally implemented Phase Lock Loop.
Figure 3:
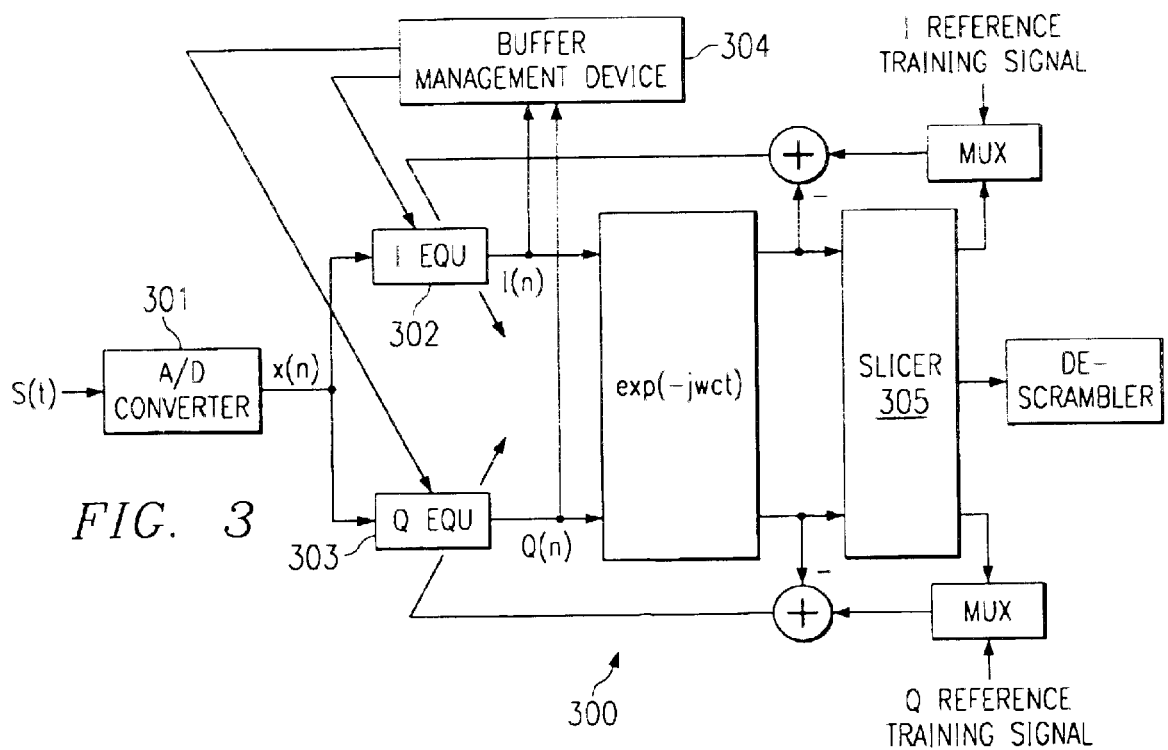
FIG. 3 is a block diagram of one embodiment of a timing recovery device for a CAP/QAM receiver according to the invention.

The proposed invention involves a modified CAP/QAM device for receiving and processing a signal. An embodiment of the receiver 300 according to the invention is illustrated in FIG. 3. The receiver 300 can be implemented solely through hard-coded electronics or can utilize a computer and software for the digital signal processing.

In a receiver 300 according to the invention, an analog signal s(t) can be digitized by an analog to digital (A/D) converter 301. The A/D converter can be incorporated into the receiver or can be implemented separately.

The processing of the digitized signal begins with two phase splitting filters implemented as linear adaptive fractionally spaced equalizers. A linear adaptive equalizer is simply a Finite Impulse Response (FIR) Filter with programmable filter coefficients. A fractionally spaced equalizer processes more than 1 A/D sample per QAM/CAP symbol period.

A FIR filter implements the difference equation $$y(n) = \sum_{k=0}^{N-1} w[k]x[n-k],$$

where x[n] are the input samples, y(n) is the filtered output, and w[k] are the coefficients (also known as tap weights). In the QAM/CAP receiver, the equalizers comprise an in-phase equalizer 302 and a quadrature equalizer 303, which are implemented as $$I(n) = y(n) = \sum_{k=0}^{N-1} w_I[k]x[n-k] \text{ and}$$

$$Q(n) = y(n) = \sum_{k=0}^{N-1} w_Q[k]x[n-k],$$

where x[n] are the input samples from the A/D converter 301 and $w_I[k]$ are the coefficients of the in-phase equalizer 302 and $w_Q[k]$ are the coefficients of the quadrature equalizer 303, and I(n) and Q(n) are the outputs of the in-phase equalizer 302, and quadrature equalizer 303, respectively. The coefficients for the two filters, which can be stored in a buffer management device 304 or in a separate memory device or buffers, define the impulse response of the equalizers. There is one set of coefficients for the in-phase equalizer and one set of coefficients for the quadrature equalizer. The length of the equalizer filters (N in the above equations) can be set according to system parameters such as the particular characteristics of the channel being equalized.

During the start up state of the receiver, the two equalizers are trained using a standard Least Means Square (LMS) algorithm using a known training sequence. Training an equalizer refers to the changing of the coefficients over some time period such that a criterion is satisfied. In this case, the minimization of the mean square error is the criterion. The LMS algorithm iteratively updates the filter coefficients using the following equations:

$$e(n)=d(n)-w^H(n)u(n), \text{ and}$$

$$w(n+1)=w(n)+\mu u(n)e^*(n),$$

where e*(n) is the complex conjugate of the estimation error, w(n) is the tap weight vector (i.e. the set of coefficients), w(n+1) is the updated coefficient set after one iteration, d(n) is the desired result, and $w^H(n)u(n)$ is the output of the equalizer filter, and $\mu$ is the update step size (0<$\mu$<1). The superscript H denotes the Hermitian transposition (i.e. the operation of vector transposition with complex conjugation). Each equalizer has its own set of coefficients which can be stored in separate buffers and which are updated separately.

The desired results d(n) are points of a QAM constellation. For a simple 4-QAM constellation, the two dimensional coordinates, (x,y), are (1,1), (–1,1), (–1,–1), and (1,–1). The desired results are then a sequence of 1's and –1's. During training, d(n) can be a sequence that is known to both the transmitter and receiver. In the QAM/CAP receiver being described, the two equalizers are trained and updated independently. The in-phase equalizer uses the x coordinate values as the desired results while the quadrature equalizer uses the y coordinate values as desired results. In the above equations, u(n) for the in-phase equalizer is represented as I(n), and u(n) for the quadrature equalizer is represented as Q(n). After a number of iterations, the estimation error should converge to some minimum value and the coefficients for the equalizers should converge to steady state values. An example of a converged equalizer with a set of 32 coefficients is shown in FIG. 4.

For updating the coefficients after training, the desired results d(n) are obtained from the outputs of the slicer 305. The slicer 305 selects the closest constellation point to the equalizer outputs.

Thus, in the 4-QAM example, if I(n) (the output of the in-phase equalizer) is 0.75, then the closest x coordinate, the sliced value, is 1 (0.75 is closest to 1 rather than –1). Therefore, the sliced value, I'(n)=1, is the d(n) to be used in the error equation. The error e(n) would then be $$e(n) = d(n) - w^H(n)u(n)$$
$$= I'(n) - I(n)$$
$$= 1 - 0.75$$
$$= 0.25$$

where I'(n) is the value of the slicer output and I(n) is the equalizer output.

In conventional QAM/CAP receivers, the adaptive equalizer is used to compensate for changes in channel characteristics. A previously stated, timing recovery is performed by a separate timing recovery block. However, because a fractionally space equalizer has the ability to incorporate a fractional delay into its impulse response, the adaptive fractionally space equalizer can be used as the timing recovery block as well as the channel compensation block.

Assuming that the transmission channel has no time varying aspect to it, the transmitter and receiver clocks can drift apart, thereby creating a timing drift. To correct for timing drift, the adaptive equalizers can be continually updated using the LMS algorithm. The coefficients of the equalizers will change such that the mean square error e(n) is continuously minimized. This LMS algorithm tracks the timing drift.

After some time, the equalizer coefficients may look like those in FIG. 5. The highest valued coefficients have drifted to one side of the filter. Before the invention, the coefficients with the most energy could drift out of a buffer storing the coefficients, causing the receiver to fail.

To overcome this problem, the present invention provides a buffer management device 304 having an equalizer filter 601 designed to monitor the movement of the coefficients within a tracking buffer 604. An example of a length-32 tap digital filter according to the invention is illustrated in FIG. 6. At time t(0), the data filter buffer 602 and the coefficient filter buffer 603, each of length 32, are used to compute the filter output. The data filter buffer 602 and the coefficient filter buffer 603 can be centered inside the much longer buffers, such as the tracking buffers 604. Alternatively, the coefficient filter buffer 603 and the data filter buffer 602 can be separate buffers which point to the locations of the set of coefficients, represented by 603, and the set of data, represented by 602, which are to be used in the equalizer filter. In the example, the tracking buffers are of length 128. The coefficients 605 outside the 32 centered coefficients 605 are initialized to zero. As described above, the filter output of either the filters of the in-phase equalizer 302 or quadrature equalizer 303 can be represented as $$y(n) = \sum_{k=0}^{N-1} w[k]x[n-k].$$

For a length-32 filter with an overall buffer length of 128, as provided in the example, the output at t(0) can be represented as:

$$y[n+i] = \sum_{k=i}^{i+N-1} x(n+i)w[n+i-k],$$

where initially i=48, (i.e. the first element of the length-32 filter buffers centered within the tracking buffers).

A buffer management device 304, which can be implemented as hard coded electronics or can utilize a computer and software, determines the direction of the movement of the coefficients 605 by comparing sets of filter coefficients 605 to determine which sets hold the greatest values. In this way the buffer management device 304 can track the direction of timing drift. Accordingly, the buffer management device 304 allows for centering of the coefficients 605 by adjusting the relative positions of the coefficients 605 within the their respective buffers. While the methods described below for comparing and centering coefficients are directed one set of coefficients, either the I or Q coefficients may be calculated or both.

In an initial state, the coefficients 605 in the center of the coefficient filter buffer 603 normally hold the greatest values. By comparing the values of the center coefficients 605 to the coefficient values to the left of center as well as comparing the center coefficient values with the coefficient values to the right of center, the buffer management device 301 can determine which way the coefficients 605 are moving.

One scheme for tracking coefficients 605 is by comparing the sum of the absolute values of a contiguous set of highest valued coefficients 605. At least three sums may be computed based on a set of coefficients 605 about the center of the entire set of coefficients 605, a set to the left of center and a set to the right of center. Choosing the length and the relative positions of the sets used for the summations depends upon the initial characteristics of the filter, but preferably encompass most of the highest valued coefficients 605. By choosing longer sets or more than three sets, the more operations which would be required to compute the summations. Whereas by choosing shorter or fewer sets, the greater is the chance of an error in estimating drift direction. For example, the total summation of all coefficient sets can be 80% of the total summation of all coefficients in a tracking buffer.

The sets of coefficients chosen for summation can be contiguous or overlapping. For example in FIG. 4, three contiguous sets of a length-8 coefficient set encompass most of the highest valued coefficients. The following summations can represent the sums of the absolute values of the three overlapping sets of eight coefficients:

$$\text{left\_sum} = \sum_{k=i+N/2-12}^{i+N/2-4} \text{abs}(w[k]),$$

$$\text{center\_sum} = \sum_{k=i+N/2-4}^{i+N/2+4} \text{abs}(w[k]), \text{ and}$$

$$\text{right\_sum} = \sum_{k=i+N/2+4}^{i+N/2+12} \text{abs}(w[k]).$$

Once the sums of coefficients are computed, it is possible to center the sums by comparing the sums and shifting the sums accordingly.

One variation of a buffer management device according to the invention compares the summation result of the left set with the summation result of the center set. If the summation of the left set is greater, then the device shifts the filter buffers storing the coefficient sets to the left within the tracking buffers. If the summation result of the left set is not greater, the device compares the summation result of the center set with the summation result of the right set. If the summation of the right set is greater than the summation of the center set, then the device shifts the filter buffers to the right within the tracking buffers. If the summation of the right set is not greater, then the position of the filter buffers within the tracking buffers is not changed. While the above method describes comparing one set of coefficients, both sets of in-phase and quadrature filter coefficients can be centered together. Alternatively, both sets may be compared separately, and the amount of centering can be the average of the centering result performed on both sets of coefficients.

To center the coefficient set, the buffer management device 301 can shift the filter buffers storing the coefficients for the in-phase and quadrature equalizers by an amount, adj, sufficient to move the high valued coefficients so that they are substantially centered within the filter buffer. The amount of adjustment required depends upon the variability of drift in the system and can be adjusted accordingly. One way of automatically adjusting this amount, adj, is by using a feedback loop which compares the current coefficient summation sets with a prior set and adjusting the amount of shift, adj, accordingly. The amount of adjustment can be the distance from the center of the center sum to the closest edge of an adjacent set. In the current example, adj=4.

The comparison performed by the buffer management device can be represented by the following algorithm:

If left_sum>center_sum, then i=i−adj
else if right_sum>center_sum, then i=i+adj,
else do not change i.

Thus if i has been changed, the filter is operating on 32 different data and coefficient buffer elements. As a consequence, the above device allows a receiver to track any timing drift where the filter buffers have not drifted past the edges of the tracking buffers. FIGS. 7a and 7b illustrate the limits of the example the system using length-32 filter buffers within 128-element tracking buffers. The time it takes for the coefficients to drift to the edge of the tracking buffers depends on the difference in the transmitter and receiver clock frequencies. The length of the tracking buffers should be chosen such that the coefficients will not reach the edges within the time frame of the transmission burst. If the tracking buffers were of infinite length, the receiver can hypothetically track the timing difference of an infinite length transmission.

The present invention is ideally suited for CAP/QAM modems that use burst messages. The length of the buffer can be made as large as required to take into account an anticipated worst case burst length as well as the expected instability in the transmitter and receiver clocks.

Although the invention has been described here by reference to specific embodiments thereof, such embodiments are susceptible of variation and modification without departing from the spirit and scope of the provided claims.

What is claimed is:

1. A method for timing recovery of a digital signal in a telecommunications receiver, comprising:

filtering through an equalizer, an instance of the digital signal with a selected plurality of filter coefficients, corresponding to the contents of a contiguous sequence of coefficient locations within a tracking buffer that has a larger number of coefficient locations than the number of filter coefficients in the selected plurality of filter coefficients;

updating the contents of the tracking buffer responsive to the filtering step;

determining a set of coefficient locations in the tracking buffer having highest coefficient values;

responsive to the set of coefficient locations being at a different position from the selected plurality of filter coefficients within the tracking buffer, selecting a shifted contiguous sequence of coefficient locations for the selected plurality of filter coefficients; and repeating the filtering and updating steps for a next instance of the digital signal.

2. A method for timing recovery of a digital signal in a telecommunications receiver, comprising:

tracking a plurality of coefficients in a tracking buffer for timing drift, the tracking step comprising:
summing a set of left coefficients,
summing a set of center coefficients,
summing a set of right coefficients,
comparing the set of left coefficients, the set of center coefficients, and the set of right coefficients to obtain a set with the greatest weighting; and centering the plurality of coefficients in the tracking buffer, by centering the plurality of coefficients about the set with the greatest weighting, filtering, through an equalizer, the digital signal with the plurality of coefficients, and updating the plurality of coefficients in the tracking buffer.

3. A method for timing recovery of a digital signal in a telecommunications receiver, comprising:

splitting the digital signal into an in-phase input signal and a quadrature input signal, filtering through an in-phase equalizer, the in-phase signal with a selected plurality of in-phase coefficients corresponding to the contents of a contiguous sequence of coefficient locations within an in-phase tracking buffer that has a larger number of coefficient locations than the number of coefficients in the selected plurality of in-phase coefficients, filtering, through a quadrature equalizer, the quadrature signal with the a selected plurality of quadrature coefficients, updating the plurality of in-phase coefficients in the tracking buffer, updating the plurality of quadrature coefficients in the tracking buffer, determining a set of coefficient locations in the in-phase tracking buffer having highest coefficient values, responsive to the set of coefficient locations being at a different position from the selected plurality of in-phase coefficients within the in-phase tracking buffer, selecting a shifted contiguous sequence of coefficient locations for the selected plurality of in-phase coefficients, and repeating the splitting, filtering and updating steps.

4. A method for timing recovery according to claim 3, wherein the selected quadrature coefficients correspond to the contents of a contiguous sequence of coefficient locations within a quadrature tracking buffer that has a larger number of coefficient locations than the number of coefficients in the selected plurality of quadrature coefficients and further comprising:

determining a set of coefficient locations in the quadrature tracking buffer having highest coefficient values, and responsive to the set of coefficient locations being at a different position from the selected plurality of quadrature coefficients within the in-phase tracking buffer, selecting a shifted contiguous sequence of coefficient locations for the selected plurality of quadrature coefficients.

5. A timing recovery device for processing a digital signal comprising an equalizer for processing said digital signal, a tracking buffer having a plurality of coefficient locations defining a length of the tracking buffer, the tracking buffer for storing a plurality of equalizer coefficients in a sequence of coefficient locations that is shorter than the length of the tracking buffer, the plurality of equalizer coefficients to be applied to said equalizer, and a buffer manager for tracking the contents of the coefficient locations within the tracking buffer, and for shifting the sequence of coefficient locations in the tracking buffer to be applied as the plurality of equalizer coefficients responsive to shifts, within the tracking buffer, of a set of coefficient locations having the highest coefficient values.

6. A timing recovery device according to claim 5, wherein the tracking buffer comprises:
a data tracking buffer for storing a portion of said digital signal in a plurality of data locations at a selected position of the data tracking buffer, and
a coefficient tracking buffer for storing said equalizer coefficients.

7. A timing recovery device according to claim 5, further comprising:
a data tracking buffer for pointing to a location of said tracking buffer at which a portion of the digital signal is stored, and
a coefficient tracking buffer for pointing to a location of said tracking buffer at which said equalizer coefficients are stored.

8. A receiver, comprising:
an analog-to-digital converter, for converting a received analog signal to digital samples;
an adaptive equalizer, for applying a digital filter to a sequence of the digital samples using a sequence of continually updated filter coefficients;
a tracking buffer, for storing the sequence of filter coefficients, the tracking buffer having a length longer than the length of the sequence of filter coefficients used by the adaptive equalizer; and
buffer management circuitry, for tracking movement, within the tracking buffer, of the position of those filter coefficients having the highest values, and for shifting the position of the sequence of filter coefficients within the tracing buffer, so that those filter coefficients having the highest values are in a central portion of the sequence.

9. The receiver of claim 8, wherein the tracking buffer comprises:
a data sample tracking buffer, for storing data samples including the sequence of digital samples;
a tap weight tracking buffer, for storing filter coefficients including the sequence of filter coefficients.

10. A receiver comprising:
an analog-to-digital converter, for converting a received analog signal to digital samples;
an adaptive equalizer, for applying a digital filter to a sequence of the digital samples using a sequence of continually updated filter coefficients;
a tracking buffer, for storing the sequence of filter coefficients, the tracking buffer having a length longer than the length of the sequence of filter coefficients used by the adaptive equalizer, and comprising:
a data sample tracking buffer for storing data samples, the data sample tracking buffer including a data filter buffer within the data sample tracking buffer for storing the sequence of digital samples; and
a tap weight tracking buffer for storing filter coefficients, the tap weight tracking buffer including a coefficient filter buffer within the tap weight tracking buffer for storing the sequence of filter coefficients;
buffer management circuitry, for tracking movement, within the tracking buffer, of the position of those filter coefficients having the highest values, and for shifting the position of the coefficient filter buffer within the tap weight tracking buffer so that those filter coefficients having the highest values are in a central portion of the sequence of filter coefficients and for shifting the position of the data filter buffer within the data sample tracking buffer corresponding to shifts in the position of the coefficient filter buffer within the tap weight tracking buffer.

11. A receiver comprising:
an analog-to-digital converter, for converting a received analog signal to digital samples;
an adaptive equalizer, for applying a digital filter to a sequence of the digital samples using a sequence of continually dated filter coefficients;
a tracking buffer, for storing the sequence of filter coefficients, the tracking buffer having a length longer than the length of the sequence of filter coefficients used by the adaptive equalizer, the tracking buffer comprising:
a data sample tracking buffer, for storing data samples including the sequence of digital samples; and
a tap weight tracking buffer, for storing filter coefficients including the sequence of filter coefficients;
buffer management circuitry, for tracking movement, within the tracking buffer, of the position of those filter coefficients having the highest values, and for shifting the position of the sequence of filter coefficients within the tracking buffer, so that those filter coefficients having the highest values are in a central portion of the sequence;
a data filter buffer for string a value pointing to the location of the sequence of digital samples within the data sample tracking buffer; and
a coefficient filter buffer for storing a value pointing to the location of the sequence of filter coefficients within the tap weight tracking buffer;
wherein the buffer management circuitry adjusts the value stored in the coefficient filter buffer so that those filter coefficients having the highest values are in a central portion of the sequence of filter coefficients;
and wherein the buffer management circuitry adjusts the value stored in the data filter buffer corresponding to adjustment of the value stored in the coefficient filter buffer.

12. A receiver comprising:
an analog-to-digital converter, for converting a received analog signal to digital samples;
an adaptive equalizer, for applying a digital filter to a sequence of the digital samples using a sequence of continually updated filter coefficients, and comprising:
an in-phase adaptive equalizer for applying a digital filter to a sequence of the digital samples corresponding to an in-phase component of the analog signal, using a sequence of continually updated in-phase filter coefficients; and
a quadrature-phase adaptive equalizer for applying a digital filter to a sequence of the digital samples corresponding to a quadrature-phase component of the analog signal, using a sequence of continually updated quadrature-phase filter coefficients;
a tracking buffer is for storing the sequence of in-phase filter coefficients and the sequence of quadrature-phase filter coefficients, the tracking buffer having a length longer than the length of the sequence of filter coefficients used by the adaptive equalizer; and
buffer management circuitry for tracking movement of the position within the tracking buffer of both the in-phase and quadrature-phase filter coefficients having the highest values, and for shifting the position of both the in-phase and quadrature-phase sequences of filter coefficients within the tracking buffer, so that those filter coefficients having the highest values are in a central portion of the sequence.

* * * * *